US008508503B2

(12) United States Patent
Lin et al.

(10) Patent No.: US 8,508,503 B2
(45) Date of Patent: Aug. 13, 2013

(54) TOUCH PANEL AND METHOD OF REDUCING NOISE COUPLED BY A COMMON VOLTAGE OF A TOUCH PANEL

(75) Inventors: Jian-Hong Lin, Hsin-Chu (TW); Wen-Rei Guo, Hsin-Chu (TW); Ching-Hua Chuang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 330 days.

(21) Appl. No.: 13/072,803

(22) Filed: Mar. 28, 2011

(65) Prior Publication Data

US 2012/0146920 A1 Jun. 14, 2012

(30) Foreign Application Priority Data

Dec. 14, 2010 (TW) .............................. 99143674 A

(51) Int. Cl.
*G06F 3/041* (2006.01)

(52) U.S. Cl.
USPC .......................................... 345/174; 345/173

(58) Field of Classification Search
USPC ................................................ 345/173–179
See application file for complete search history.

(56) References Cited

U.S. PATENT DOCUMENTS

| | | | |
|---|---|---|---|
| 7,542,021 | B2 | 6/2009 | Kim |
| 2006/0214921 | A1 | 9/2006 | Takahashi |
| 2008/0231607 | A1 | 9/2008 | Utsunomiya |
| 2009/0002303 | A1 | 1/2009 | Huang |
| 2010/0110040 | A1 | 5/2010 | Kim |
| 2012/0229421 | A1 | 9/2012 | Kim et al. |

FOREIGN PATENT DOCUMENTS

| | | |
|---|---|---|
| CN | 1838048 A | 9/2006 |
| CN | 101937662 A | 1/2011 |
| JP | 2006209064 | 8/2006 |
| TW | 201023129 | 6/2010 |

*Primary Examiner* — Ricardo L Osorio
(74) *Attorney, Agent, or Firm* — Winston Hsu; Scott Margo

(57) ABSTRACT

A touch panel includes a touch sensor, a liquid crystal panel, and a reverse circuit. The reverse circuit receives common voltage ripples of the liquid crystal panel, and outputs reversed common voltage ripples after reversing the common voltage ripples. After the touch sensor receives the reversed common voltage ripples, the touch sensor outputs a sensing signal according to the reversed common voltage ripples.

14 Claims, 14 Drawing Sheets

TOUCH PANEL AND METHOD OF REDUCING NOISE COUPLED BY A COMMON VOLTAGE OF A TOUCH PANEL

BACKGROUND OF THE INVENTION

1. Field of the Invention

The present invention is related to a touch panel and a method of reducing noise coupled by a common voltage of a touch panel, and particularly to a touch panel and a method of reducing noise coupled by a common voltage of a touch panel that utilize a reverse circuit to reduce common voltage ripples of a liquid crystal panel coupled to a touch sensor.

2. Description of the Prior Art

Please refer to FIG. 1A and FIG. 1B. FIG. 1A is a diagram illustrating a touch sensor 102 outputting a sensing signal SS with higher signal-to-noise ratio when the touch sensor 102 is not coupled to a liquid crystal panel, and FIG. 1B is a diagram illustrating the touch sensor 102 outputting a sensing signal SS with lower signal-to-noise ratio when the touch sensor 102 is coupled to the liquid crystal panel 104. As shown in FIG. 1A, when sensing lines 1022 of the touch sensor 102 have voltage variation, capacitor variation, and/or electric field variation caused by an object 1024 (such as a finger), the touch sensor 102 outputs the sensing signal SS according to the voltage variation, the capacitor variation, and/or the electric field variation. Because the voltage variation, the capacitor variation, and/or the electric field variation of the sensing lines 1022 is only caused by the object 1024, the sensing signal SS outputted by the touch sensor 102 has the higher signal-to-noise ratio.

In addition, as shown in FIG. 1B, the voltage variation, the capacitor variation, and/or the electric field variation of the sensing lines 1022 is not only caused by the object 1024, but also influenced by common voltage ripples CV of the liquid crystal panel 104. Therefore, when the sensing lines 1022 of the touch sensor 102 have the voltage variation, the capacitor variation, and/or the electric field variation caused by the object 1024, the sensing signal SS outputted by the touch sensor 102 has the lower signal-to-noise ratio.

SUMMARY OF THE INVENTION

An embodiment provides a touch panel. The touch panel includes a touch sensor, a liquid crystal panel, and a reverse circuit. The touch sensor is used for outputting at least one sensing signal corresponding to at least one object when the at least one object touches the touch panel. The liquid crystal panel includes a common electrode, the liquid crystal panel used for executing at least one corresponding operation according to the at least one sensing signal. The reverse circuit has a first terminal coupled to the liquid crystal panel for receiving common voltage ripples of the common electrode of the liquid crystal panel coupled to the touch sensor, a second terminal coupled to the touch sensor for outputting reversed common voltage ripples wherein the touch sensor is located on the liquid crystal panel.

Another embodiment provides a method of reducing noise coupled by a common voltage of a touch panel. The method includes a reverse circuit receiving common voltage ripples of a liquid crystal panel; the reverse circuit reversing the common voltage ripples; the reverse circuit outputting reversed common voltage ripples; a touch sensor receiving the reversed common voltage ripples; the touch sensor outputting a sensing signal according to the reversed common voltage ripples.

The present invention provides a touch panel and a method of reducing noise coupled by a common voltage of a touch panel. The touch panel and the method utilize a reverse circuit to receive common voltage ripples of a common electrode of a liquid crystal panel, then the reverse circuit outputs reversed common voltage ripples to the touch sensor. After a sensing signal with low signal to noise ratio of the touch sensor (coupled to the common voltage ripples) is coupled to the reversed common voltage ripples, the reversed common voltage ripples can cancel the common voltage ripples, so that the touch sensor can generate a sensing signal with high signal to noise ratio.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
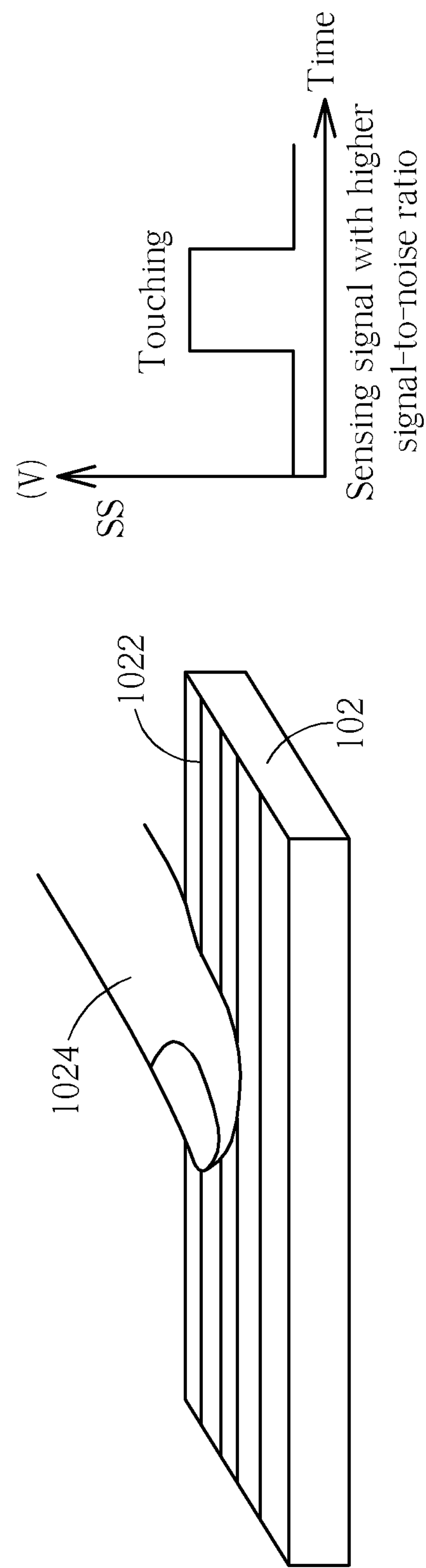
FIG. 1A is a diagram illustrating a touch sensor outputting a sensing signal with higher signal to noise ratio when the touch sensor is not coupled to a liquid crystal panel.
Figure 1B:
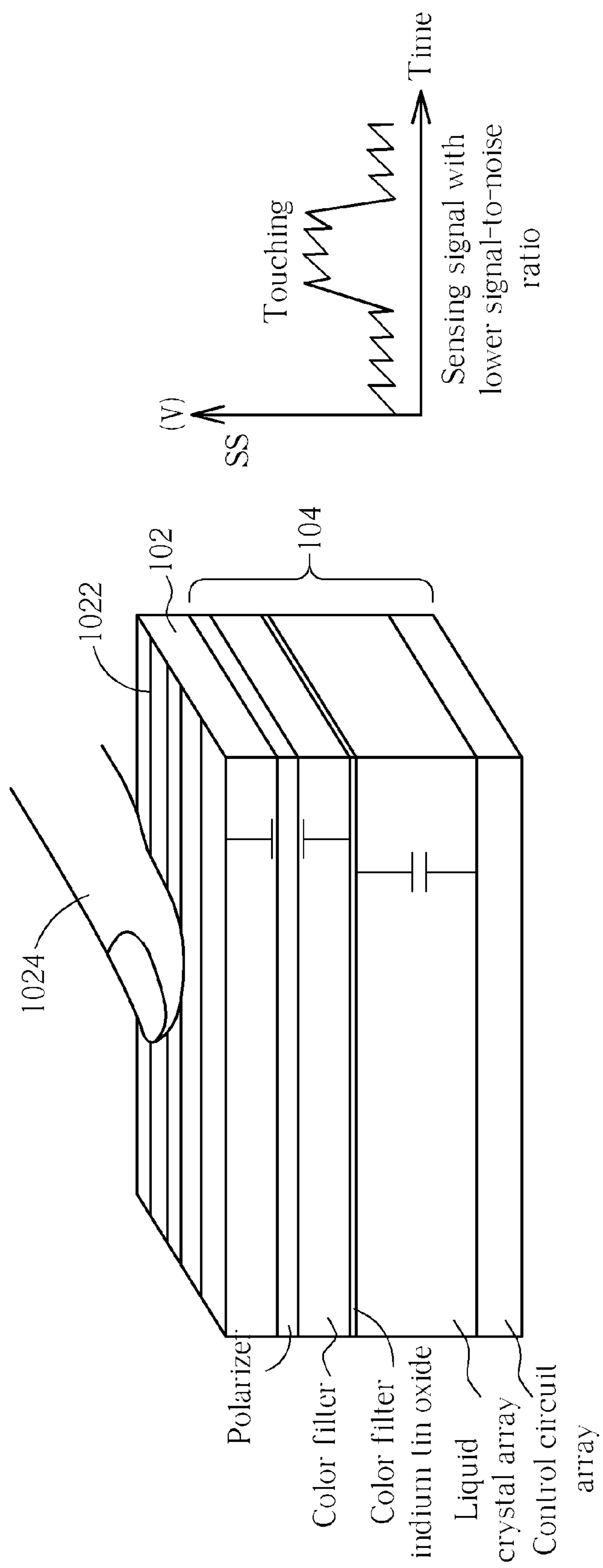
FIG. 1B is a diagram illustrating the touch sensor outputting a sensing signal with lower signal to noise ratio when the touch sensor is coupled to the liquid crystal panel.
Figure 2A:
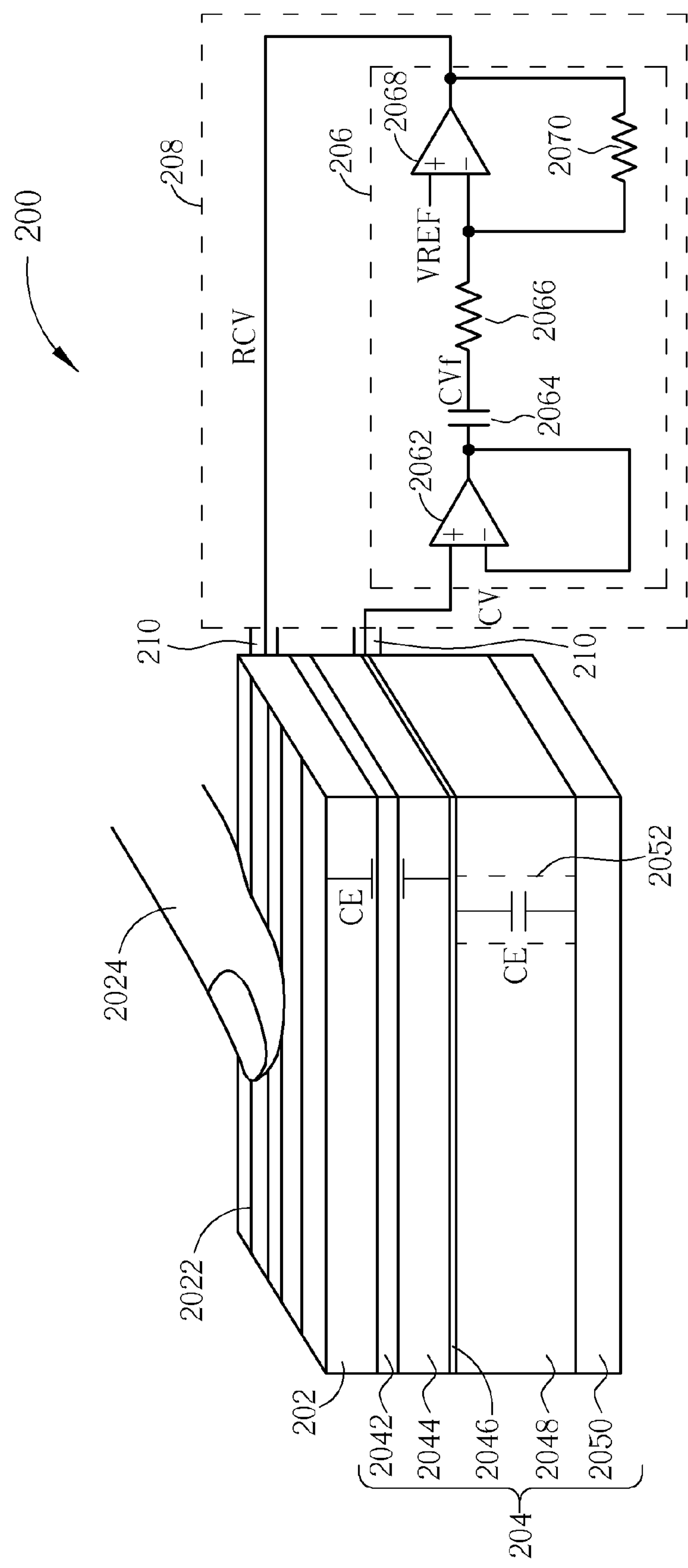
FIG. 2A is a diagram illustrating a touch panel according to an embodiment.

Please refer to FIG. 2A. FIG. 2A is a diagram illustrating a touch panel 200 according to an embodiment. The touch panel 200 includes a touch sensor 202, a liquid crystal panel 204, and a reverse circuit 206, where the touch sensor 202 is located on the liquid crystal panel 204. The touch panel 200 is a resistive touch panel or a capacitive touch panel, and the touch sensor 202 is used for outputting at least one sensing signal SS corresponding to at least one object (such as a finger) 2024 according to voltage variation, capacitor variation, and/or electric field variation of at least one sensing line 2022 of the touch sensor 202 when the at least one object 2024 touches the touch panel 200. The liquid crystal panel 204 includes a common electrode CE, and the liquid crystal panel 204 is used for executing at least one corresponding operation according to the at least one sensing signal SS from the touch sensor 202. The reverse circuit 206 has a first terminal coupled to the liquid crystal panel 204 for receiving common voltage ripples CV of the common electrode CE of the liquid crystal panel 204 coupled to the touch sensor 202, and a second terminal coupled to the touch sensor 202 for outputting reversed common voltage ripples RCV.

As shown in FIG. 2A, the liquid crystal panel 204 includes a polarizer 2042, a color filter 2044, a color filter indium tin oxide 2046, a liquid crystal array 2048, and a control circuit array 2050. The polarizer 2042 is used for absorbing polarized light having a predetermined direction, and outputting polarized light orthogonal to the predetermined direction. The color filter 2044 below the polarizer 2042 has a plurality of pixels, where each pixel has a red sub-pixel, a green sub-pixel, and a blue sub-pixel. The color filter indium tin oxide 2046 below the color filter 2044 is used for controlling turning-on of the red sub-pixel, the green sub-pixel, and the blue sub-pixel according to a pixel voltage provided by the control circuit array 2050. The liquid crystal array 2048 below the color filter indium tin oxide 2046 is used for twisting a plurality of liquid crystal molecules corresponding to the pixel to change transmittance of the plurality of liquid crystal molecules according to the pixel voltage. In addition, the control circuit array 2050 is electrically connected the color filter indium tin oxide 2046 by a conductive adhesive 2052, and the control circuit array 2050 and the color filter indium tin oxide 2046 are both coupled to the common electrode CE of the liquid crystal panel 204.

Figure 2B:
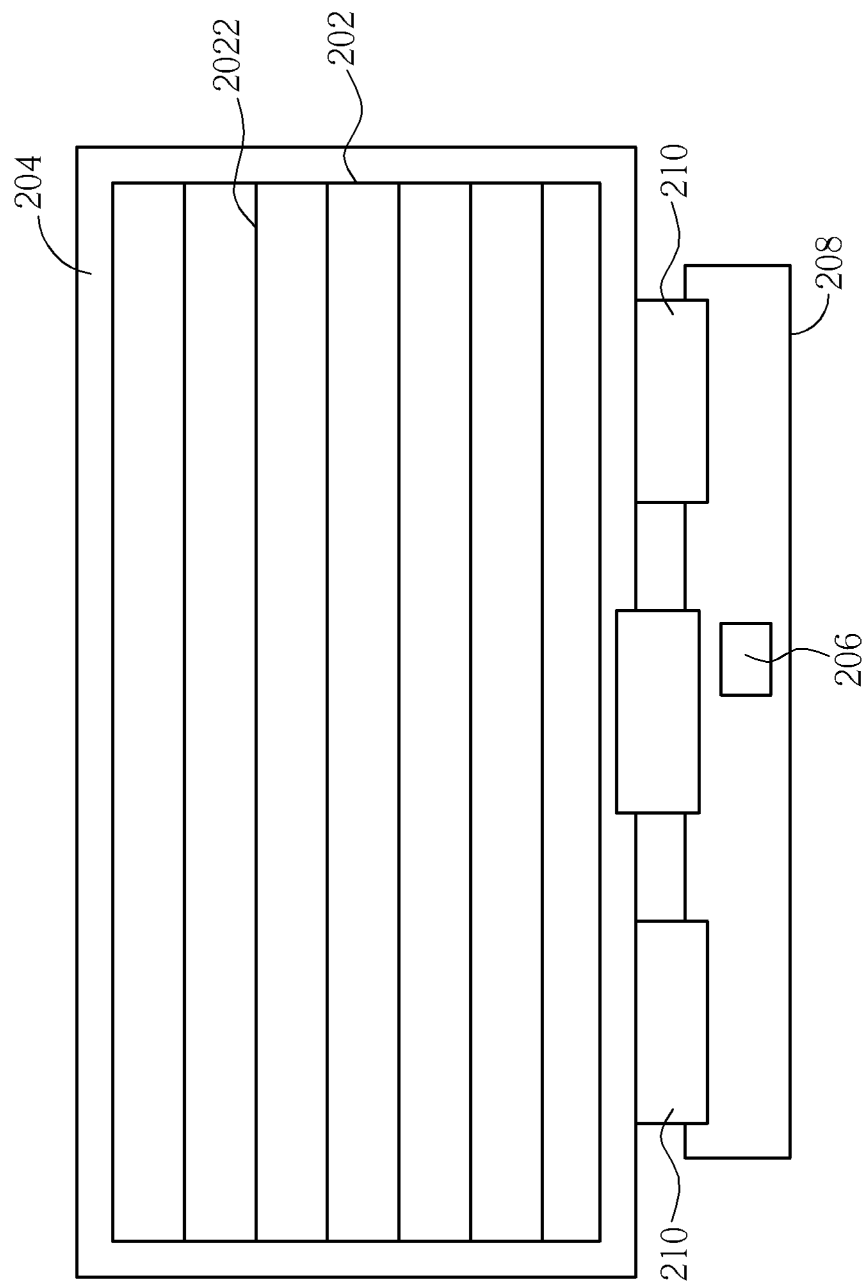
FIG. 2B is a diagram illustrating a bird's eye view of the touch sensor, the liquid crystal panel, and the reverse circuit.

As shown in FIG. 2A, the first terminal of the reverse circuit 206 is coupled to the color filter indium tin oxide 2046, and the second terminal of the reverse circuit 206 is coupled to the touch sensor 202. The reverse circuit 206 includes a first amplifier 2062, a capacitor 2064, a first resistor 2066, a second amplifier 2068, and a second resistor 2070, where the second resistor 2070 is a variable resistor. The first amplifier 2062 has a first input terminal coupled to the first terminal of the reverse circuit 206 for receiving the common voltage ripples CV, a second input terminal, and an output terminal coupled to the second input terminal of the first amplifier 2062. The capacitor 2064 has a first terminal coupled to the output terminal of the first amplifier 2062, and a second terminal. The first resistor 2066 has a first terminal coupled to the second terminal of the capacitor 2064, and a second terminal. The second amplifier 2068 has a first input terminal for receiving a reference voltage VREF, second input terminal coupled to the second terminal of the first resistor 2066, and an output terminal coupled to the second terminal of the reverse circuit 206 for outputting the reversed common voltage ripples RCV. The second resistor 2070 has a first terminal coupled to the second input terminal of the second amplifier 2068, and a second terminal coupled to the output terminal of the second amplifier 2068. In addition, please refer to FIG. 2B. FIG. 2B is a diagram illustrating a bird's eye view of the touch sensor 202, the liquid crystal panel 204, and the reverse circuit 206. As shown in FIG. 2B, the reverse circuit 206 is located on a printed circuit board 208 outside the liquid crystal panel 204, and the printed circuit board 208 is electrically connected to the liquid crystal panel 204 by a flexible printed circuit board 210.

As shown in FIG. 2A, because the second input terminal of the first amplifier 2062 is coupled to the output terminal of the first amplifier 2062 and the first input terminal of the first amplifier 2062 receives the common voltage ripples CV, a voltage of the output terminal of the first amplifier 2062 is the same as the common voltage ripples CV. The capacitor 2064 is used for filtering low frequency signals of the common voltage ripples CV and generating a voltage CVf. The reversed common voltage ripples RCV outputted by the output terminal of the second amplifier 2068 are determined by the equation (1):

$$RCV = \frac{R1 + R2}{R1}VREF - \frac{R2}{R1}CVf \quad (1)$$

As shown in the equation (1), R1 is a value of the first resistor 2066, and R2 is a value of the second resistor 2070. In addition, if the first input terminal of the second amplifier 2068 is coupled to ground (that is, the reference voltage VREF is zero) and the value R1 of the first resistor 2066 is the same as the value R2 of the second resistor 2070, the reversed common voltage ripples RCV are determined by the equation (2):

$$RCV = -CVf \quad (2)$$

As shown in the equation (2), the reversed common voltage ripples RCV are opposite to the voltage CVf, and the voltage CVf is the common voltage ripples CV after filtering out low frequency signals. But, the present invention is not limited to the reverse circuit 206 of FIG. 2A. Any reverse circuit capable of reversing the common voltage ripples CV to the reversed common voltage ripples RCV falls within the scope of the present invention.

Figure 3A:
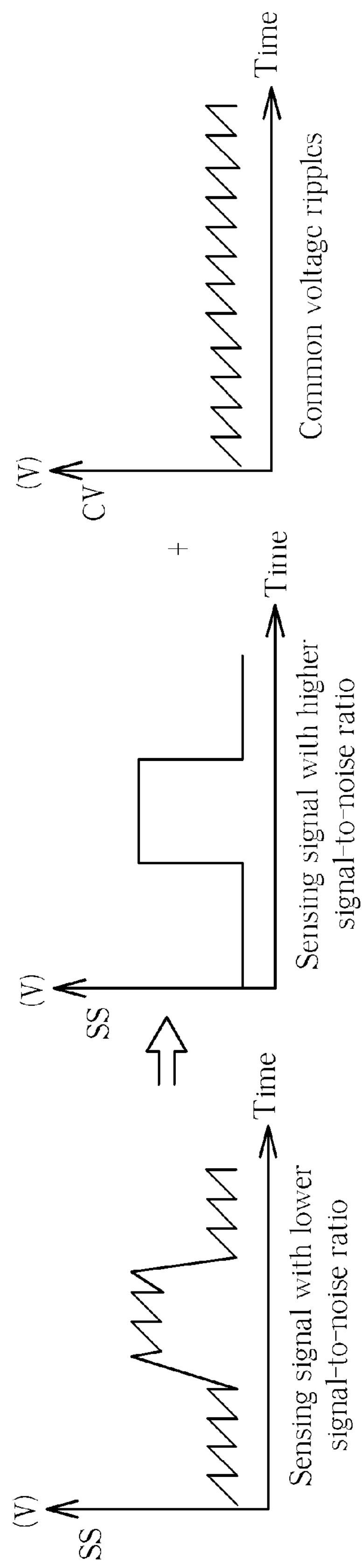
FIG. 3A is a diagram illustrating decoupling the sensing signal SS with low signal to noise ratio.
Figure 3B:
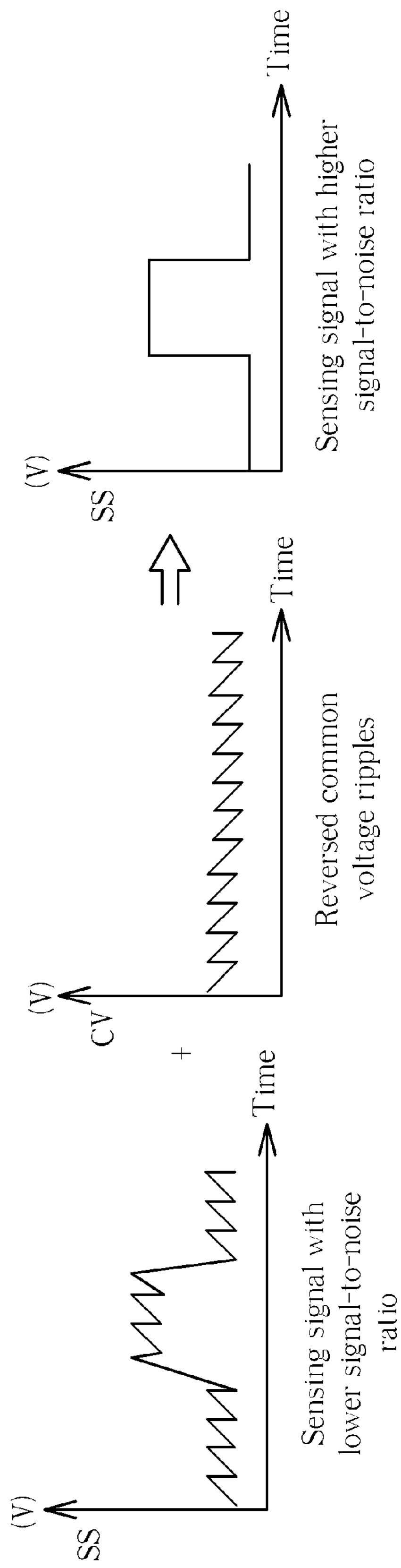
FIG. 3B is a diagram illustrating the reversed common voltage ripples coupled to the sensing signal with the low signal to noise ratio for generating the sensing signal with high signal to noise ratio.

Please refer to FIG. 3A and FIG. 3B. FIG. 3A is a diagram illustrating decoupling the sensing signal SS with low signal-to-noise ratio, and FIG. 3B is a diagram illustrating the reversed common voltage ripples RCV coupled to the sensing signal SS with the low signal-to-noise ratio for generating the sensing signal SS with high signal-to-noise ratio. As shown in FIG. 3A, the sensing signal SS with the low signal-to-noise ratio can be decoupled to the sensing signal SS not influenced by the common voltage ripples CV of the liquid crystal panel 204 and the common voltage ripples CV. Therefore, as shown in FIG. 3B, after the reversed common voltage ripples RCV are coupled to the sensing signal SS with the low signal-to-noise ratio, the reversed common voltage ripples RCV can cancel out the common voltage ripples CV, and the sensing signal SS with high signal-to-noise ratio is generated.

Figure 4:
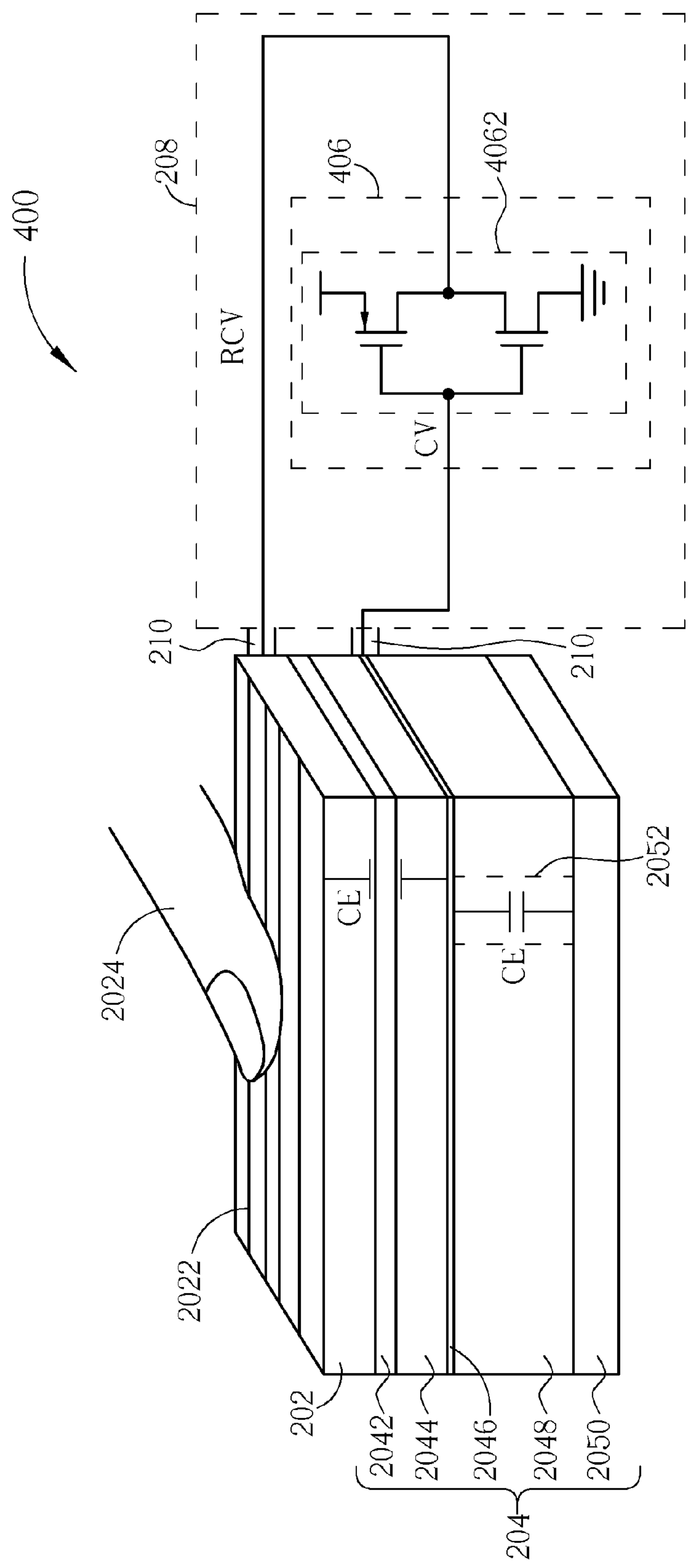
FIG. 4 is a diagram illustrating a touch panel according to another embodiment.

Please refer to FIG. 4. FIG. 4 is a diagram illustrating a touch panel 400 according to another embodiment. A difference between the touch panel 400 and the touch panel 200 is that a reverse circuit 406 of the touch panel 400 includes an inverter 4062. An input terminal of the inverter 4062 is used for receiving the common voltage ripples CV, and an output terminal of the inverter 4062 is used for outputting the reversed common voltage ripples RCV. But, the present invention is not limited to the reverse circuit 406 of FIG. 4. Any reverse circuit capable of reversing the common voltage ripples CV to the reversed common voltage ripples RCV falls within the scope of the present invention.

Figure 5:
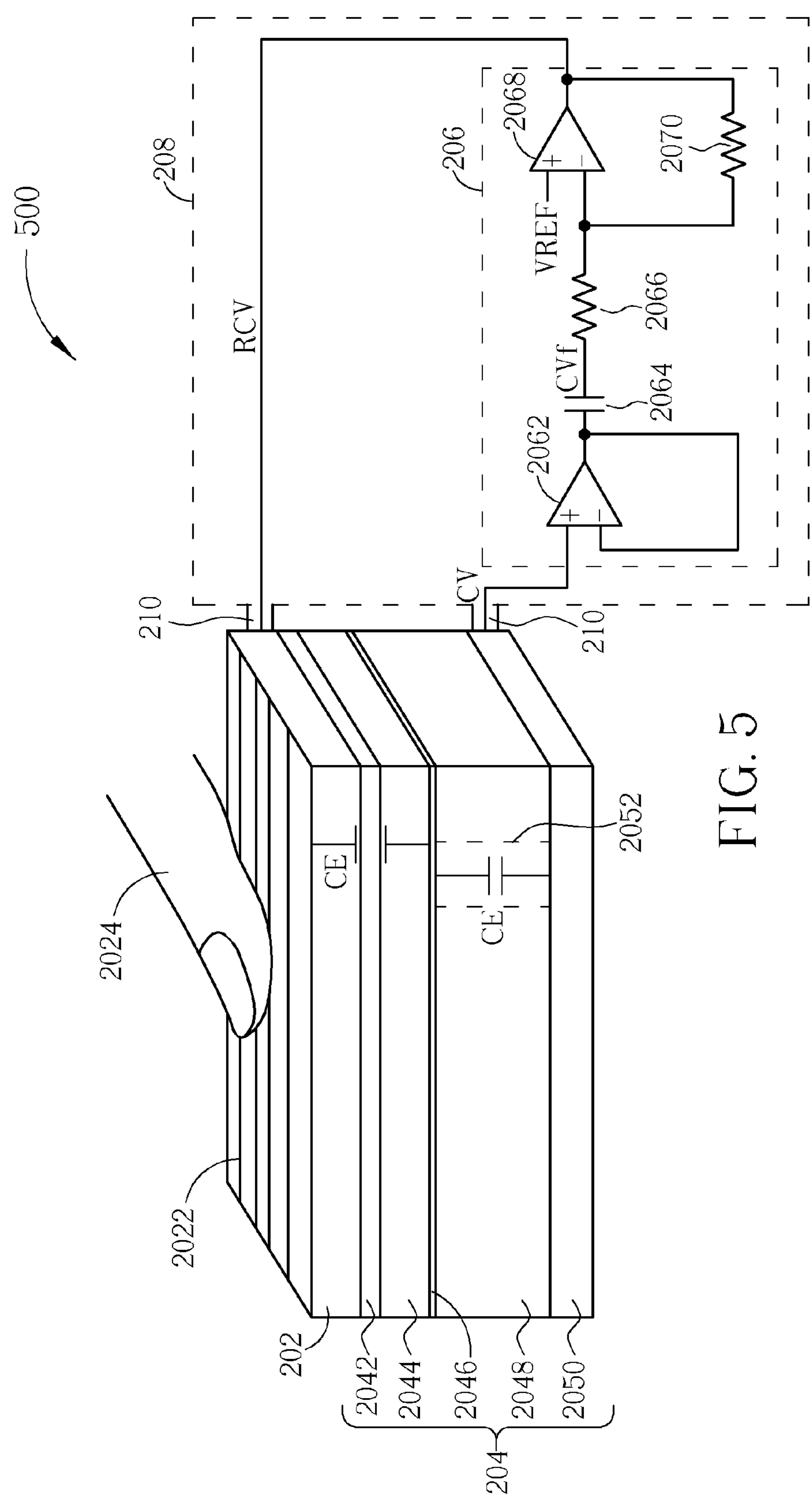
FIG. 5 is a diagram illustrating a touch panel according to another embodiment.

Please refer to FIG. 5. FIG. 5 is a diagram illustrating a touch panel 500 according to another embodiment. A difference between the touch panel 500 and the touch panel 200 is that the first terminal of the reverse circuit 206 of the touch panel 500 is coupled to the control circuit array 2050, and the second terminal of the reverse circuit 206 is coupled to the touch sensor 202. Because the control circuit array 2050 is electrically connected to the color filter indium tin oxide 2046 by the conductive adhesive 2052, the control circuit array 2050 and the color filter indium tin oxide 2046 are both coupled to the common electrode CE of the liquid crystal panel 204. Therefore, the first terminal of the reverse circuit 206 can still receive the common voltage ripples CV. In addition, subsequent operational principles of the touch panel 500 are the same as those of the touch panel 200, so further description thereof is omitted for simplicity.

Figure 6:
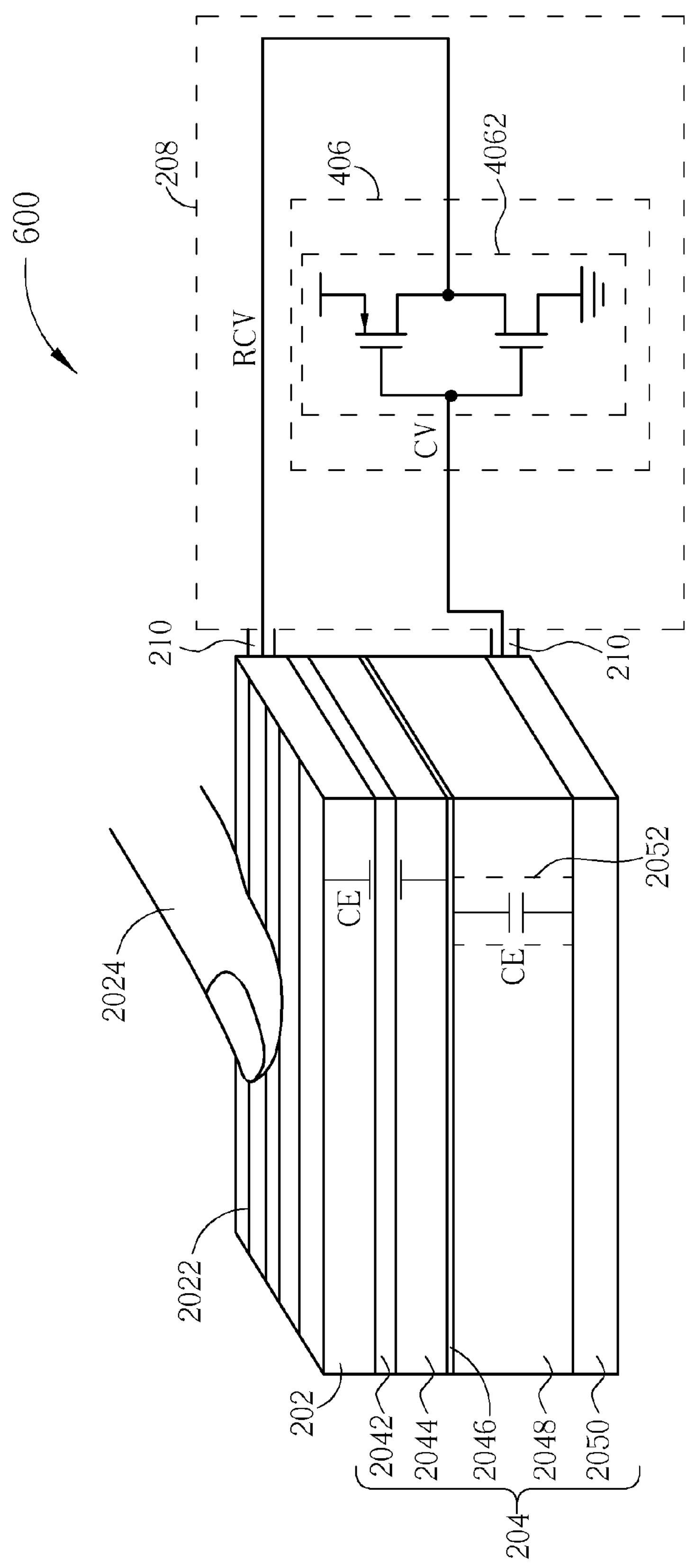
FIG. 6 is a diagram illustrating a touch panel 500 according to another embodiment.

Please refer to FIG. 6. FIG. 6 is a diagram illustrating a touch panel 600 according to another embodiment. A difference between the touch panel 600 and the touch panel 400 is that the first terminal of the reverse circuit 206 of the touch panel 600 is coupled to the control circuit array 2050, and the second terminal of the reverse circuit 206 is coupled to the touch sensor 202. In addition, subsequent operational principles of the touch panel 600 are the same as those of the touch panel 400, so further description thereof is omitted for simplicity.

Figure 7:
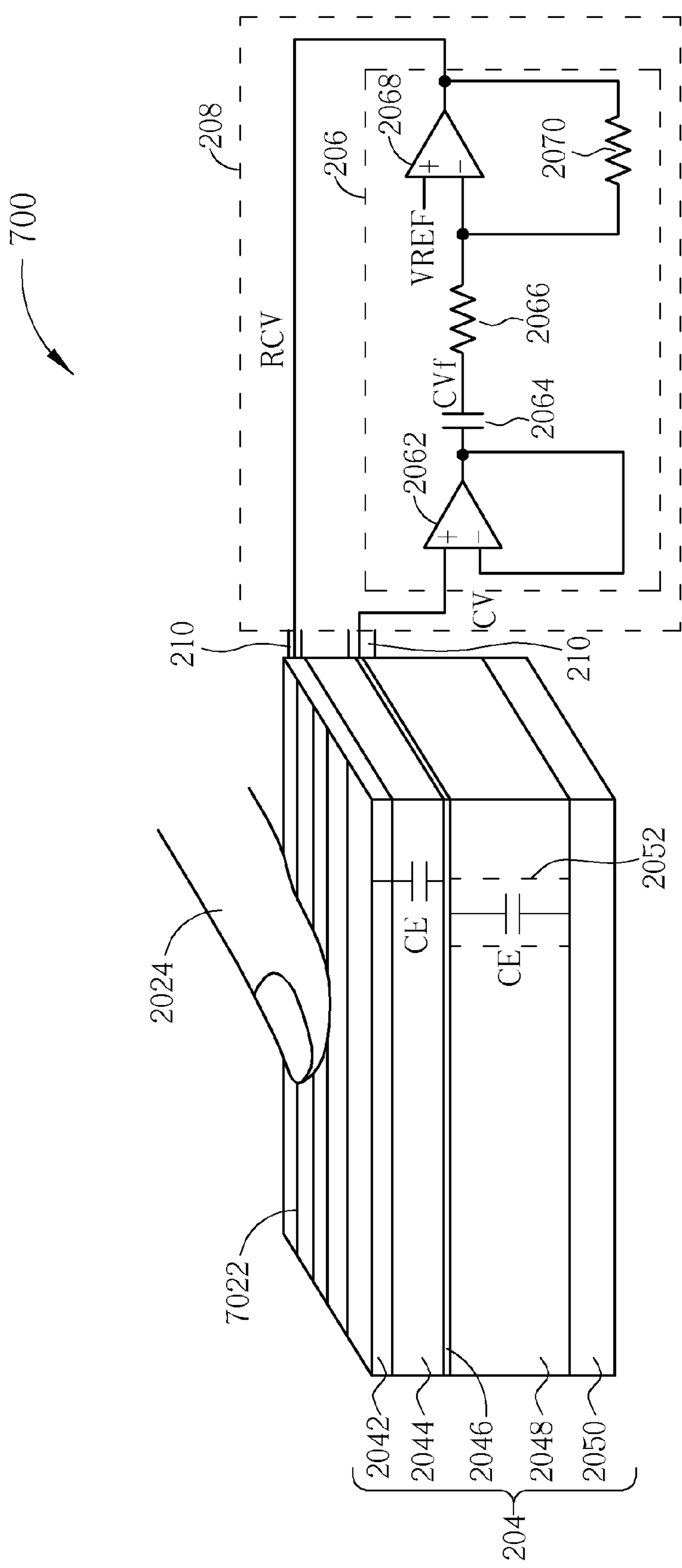
FIG. 7 is a diagram illustrating a touch panel 500 according to another embodiment.

Please refer to FIG. 7. FIG. 7 is a diagram illustrating a touch panel 700 according to another embodiment. A difference between the touch panel 700 and the touch panel 200 is that sensing lines 7022 of the touch panel 700 are integrated onto an upward side of the color filter 2044, so the touch sensor is not a single layer structure anymore. As shown in FIG. 7, the touch panel 700 lacks one layer of the touch sensor of the touch panel 200, so weight and thickness of the touch panel 700 are also less than those of the touch panel 200. In addition, subsequent operational principles of the touch panel 700 are the same as those of the touch panel 200, so further description thereof is omitted for simplicity.

Figure 8:
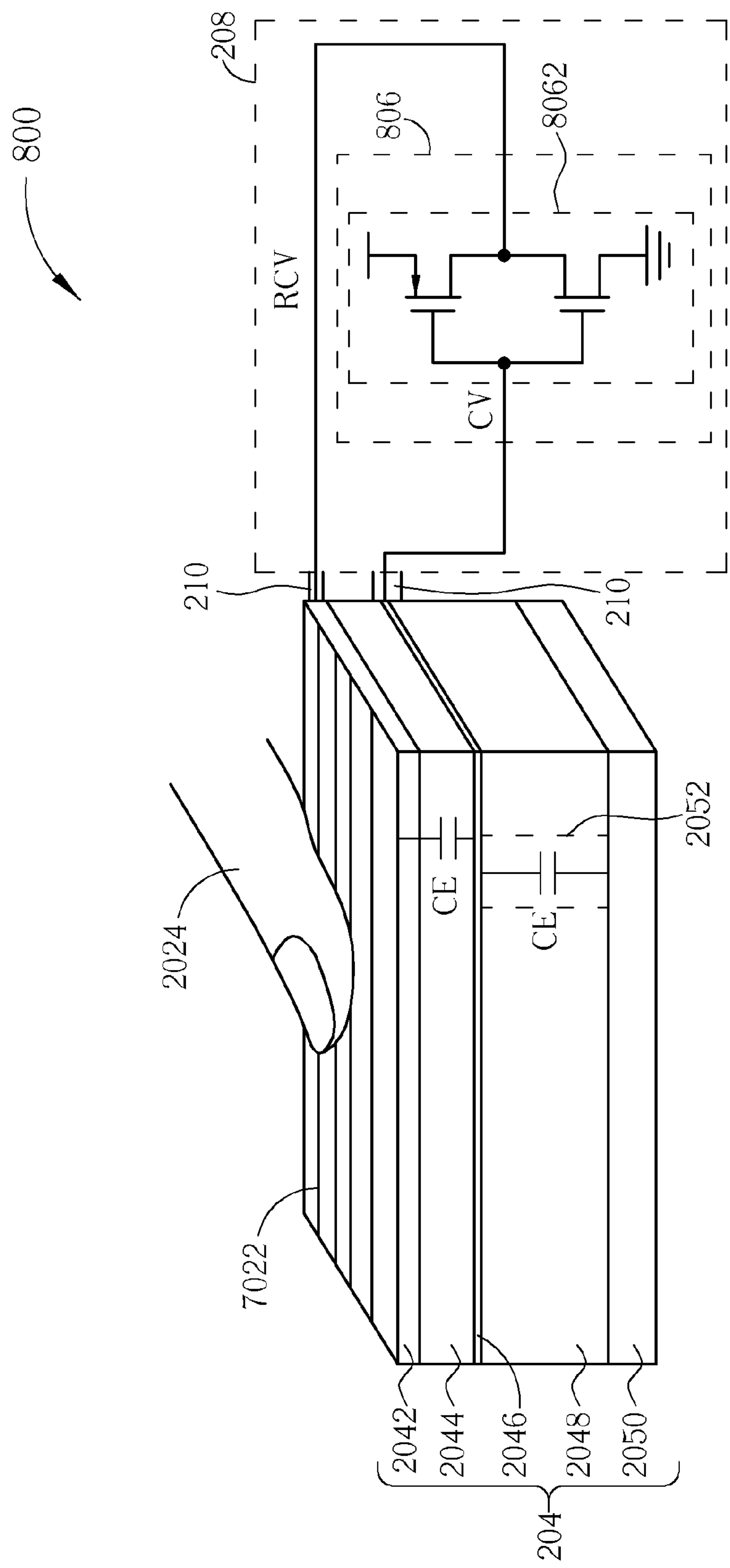
FIG. 8 is a diagram illustrating a touch panel 500 according to another embodiment.

Please refer to FIG. 8. FIG. 8 is a diagram illustrating a touch panel 800 according to another embodiment. A difference between the touch panel 800 and the touch panel 700 is that a reverse circuit 806 of the touch panel 800 includes an inverter 8062. An input terminal of the inverter 8062 is used for receiving the common voltage ripples CV, and an output terminal of the inverter 8062 is used for outputting the reversed common voltage ripples RCV. In addition, subsequent operational principles of the touch panel 800 are the same as those of the touch panel 700, so further description thereof is omitted for simplicity.

Figure 9:
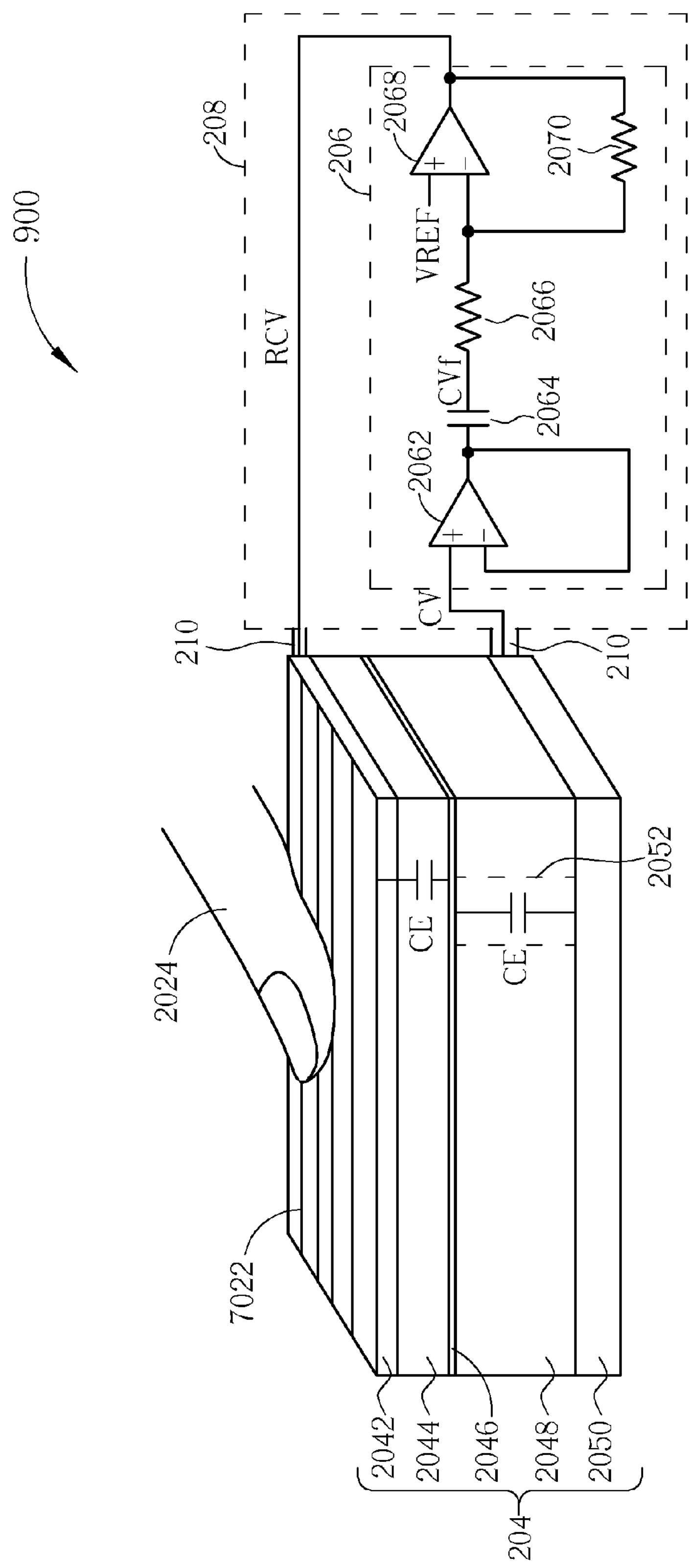
FIG. 9 is a diagram illustrating a touch panel 500 according to another embodiment.

Please refer to FIG. 9. FIG. 9 is a diagram illustrating a touch panel 900 according to another embodiment. A difference between the touch panel 900 and the touch panel 700 is that the first terminal of the reverse circuit 206 of the touch panel 900 is coupled to the control circuit array 2050, and the second terminal of the reverse circuit 206 is coupled to the sensing lines 7022. In addition, subsequent operational principles of the touch panel 900 are the same as those of the touch panel 700, so further description thereof is omitted for simplicity.

Figure 10:
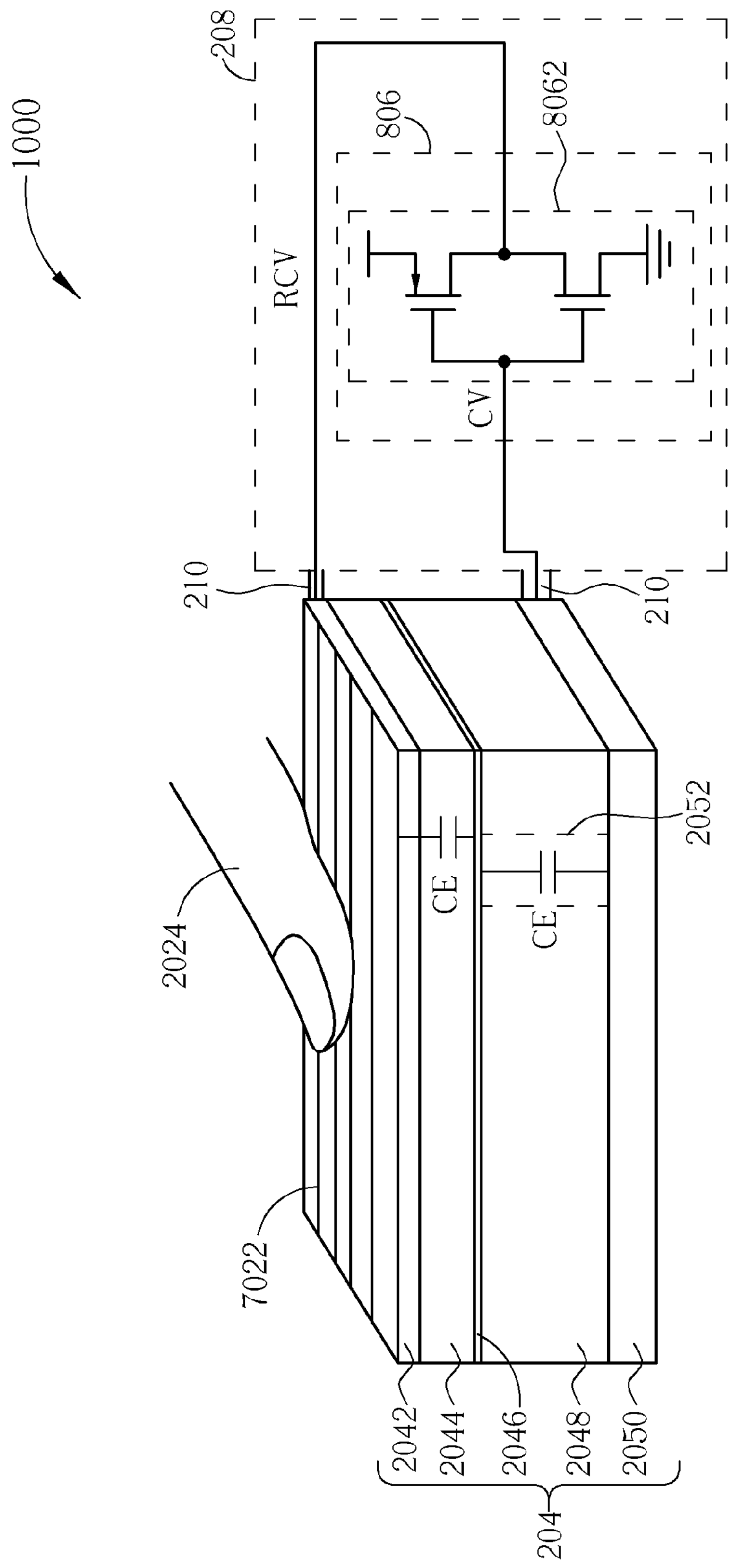
FIG. 10 is a diagram illustrating a touch panel 500 according to another embodiment.

Please refer to FIG. 10. FIG. 10 is a diagram illustrating a touch panel 1000 according to another embodiment. A difference between the touch panel 1000 and the touch panel 800 is that the first terminal of the reverse circuit 206 of the touch panel 1000 is coupled to the control circuit array 2050, and the second terminal of the reverse circuit 206 is coupled to the sensing lines 7022. In addition, subsequent operational principles of the touch panel 1000 are the same as those of the touch panel 800, so further description thereof is omitted for simplicity.

Figure 11:
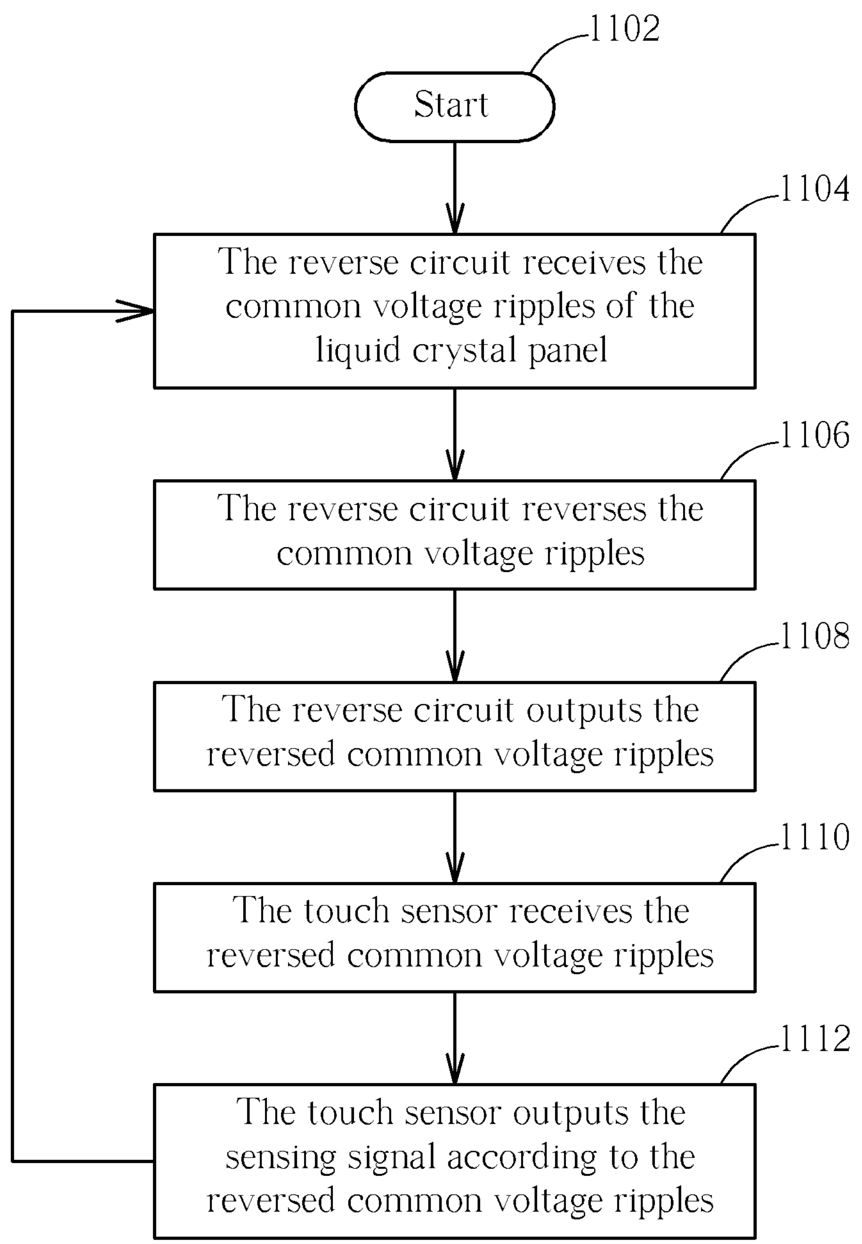
FIG. 11 is a flowchart illustrating a method of reducing noise coupled by a common voltage of a touch panel according to another embodiment.

Please refer to FIG. 11. FIG. 11 is a flowchart illustrating a method of reducing noise coupled by a common voltage of a touch panel according to another embodiment. FIG. 11 uses the touch panel 200 of FIG. 2A to illustrate the method. Detailed steps are as follows:

Step 1102: Start.

Step 1104: The reverse circuit 206 receives the common voltage ripples CV of the liquid crystal panel 204.

Step 1106: The reverse circuit 206 reverses the common voltage ripples CV.

Step 1108: The reverse circuit 206 outputs the reversed common voltage ripples RCV.

Step 1110: The touch sensor 202 receives the reversed common voltage ripples RCV.

Step 1112: The touch sensor 202 outputs the sensing signal SS according to the reversed common voltage ripples RCV; go to Step 1104.

In Step 1104, the reverse circuit 206 can receive the common voltage ripples CV through the color filter indium tin oxide 2046 of the liquid crystal panel 204 or through the control circuit array 2050 of the liquid crystal panel 204. In Step 1106, the reverse circuit 206 generates the reversed common voltage ripples RCV according to the equation (1) or the equation (2). In Step 1112, as shown in FIG. 3B, after the sensing signal SS with the low signal-to-noise ratio (coupled to the common voltage ripples CV) is coupled to the reversed common voltage ripples RCV, the reversed common voltage ripples RCV can cancel out the common voltage ripples CV, so that the touch sensor 202 can generate the sensing signal SS with the high signal-to-noise ratio.

To sum up, the touch panel and the method of reducing the noise coupled by the common voltage of the touch panel utilize the reverse circuit to receive the common voltage ripples of the common electrode of the liquid crystal panel, then the reverse circuit outputs the reversed common voltage ripples to the touch sensor. After the sensing signal with the low signal-to-noise ratio of the touch sensor (coupled to the common voltage ripples) is coupled to the reversed common voltage ripples, and the reversed common voltage ripples can cancel the common voltage ripples, so that the touch sensor can generate the sensing signal with the high signal-to-noise ratio.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:

a touch sensor for outputting at least one sensing signal corresponding to at least one object when the at least one object touches the touch panel;

a liquid crystal panel comprising a common electrode, the liquid crystal panel used for executing at least one corresponding operation according to the at least one sensing signal; and a reverse circuit having a first terminal coupled to the liquid crystal panel for receiving common voltage ripples of the common electrode of the liquid crystal panel coupled to the touch sensor, and a second terminal coupled to the touch sensor for outputting reversed common voltage ripples;

wherein the touch sensor is located on the liquid crystal panel.

2. The touch panel of claim 1, wherein the reverse circuit comprises an inverter.

3. The touch panel of claim 1, wherein the reverse circuit comprises:

a first amplifier having a first input terminal coupled to the first terminal of the reverse circuit for receiving the common voltage ripples, a second input terminal, and an output terminal coupled to the second input terminal of the first amplifier;

a capacitor having a first terminal coupled to the output terminal of the first amplifier, and a second terminal;

a first resistor having a first terminal coupled to the second terminal of the capacitor, and a second terminal;

a second amplifier having a first input terminal for receiving a reference voltage, a second input terminal coupled to the second terminal of the first resistor, and an output terminal coupled to the second terminal of the reverse circuit for outputting the reversed common voltage ripples; and a second resistor having a first terminal coupled to the second input terminal of the second amplifier, and a second terminal coupled to the output terminal of the second amplifier.

4. The touch panel of claim 1, wherein the reverse circuit is located on a printed circuit board outside the liquid crystal panel, and the printed circuit board is electrically connected to the liquid crystal panel.

5. The touch panel of claim 1, wherein the liquid crystal panel comprises:

a polarizer for absorbing polarized light having a predetermined direction, and outputting polarized light orthogonal to the predetermined direction;

a color filter below the polarizer having a plurality of pixels, wherein each pixel has a red sub-pixel, a green sub-pixel, and a blue sub-pixel;

a control circuit array for providing a pixel voltage corresponding to the pixel;

a color filter indium tin oxide (ITO) below the color filter for controlling turning-on of the red sub-pixel, the green sub-pixel, and the blue sub-pixel according to the pixel voltage; and a liquid crystal array below the color filter indium tin oxide for twisting a plurality of liquid crystal molecules corresponding to the pixel according to the pixel voltage;

wherein the control circuit array is below the liquid crystal array, the color filter indium tin oxide is located between the color filter and the liquid crystal array, and the liquid crystal array is located between the control circuit array and the color filter indium tin oxide.

6. The touch panel of claim 5, wherein the control circuit array and the color filter indium tin oxide are coupled to the common electrode of the liquid crystal panel.

7. The touch panel of claim 5, wherein the first terminal of the reverse circuit is coupled to the color filter indium tin oxide, and the second terminal of the reverse circuit is coupled to the touch sensor.

8. The touch panel of claim 5, wherein the first terminal of the reverse circuit is coupled to the control circuit array, and the second terminal of the reverse circuit is coupled to the touch sensor.

9. The touch panel of claim 5, wherein the control circuit array is electrically connected the color filter indium tin oxide by a conductive adhesive.

10. The touch panel of claim 5, wherein the touch sensor is integrated into the color filter.

11. The touch panel of claim 1, wherein the touch sensor is integrated into a color filter.

12. A method of reducing noise coupled by a common voltage of a touch panel, the method comprising:

a reverse circuit receiving common voltage ripples of a liquid crystal panel;

the reverse circuit reversing the common voltage ripples;

the reverse circuit outputting reversed common voltage ripples;

a touch sensor receiving the reversed common voltage ripples; and the touch sensor outputting a sensing signal according to the reversed common voltage ripples.

13. The method of claim 12, wherein the reverse circuit receiving the common voltage ripples is the reverse circuit receiving the common voltage ripples through a color filter indium tin oxide of the liquid crystal panel.

14. The method of claim 12, wherein the reverse circuit receiving the common voltage ripples is the reverse circuit receiving the common voltage ripples through a control circuit array of the liquid crystal panel.

* * * * *